United States Patent
Harris et al.

[15] 3,665,338
[45] May 23, 1972

[54] VARIABLE FREQUENCY INFRA RED SOURCE

[72] Inventors: Robert B. Harris; John A. MacDonald, both of Cherry Hill, N.J.

[73] Assignee: Synergetics Research, Inc., Sea Girt, N.Y.

[22] Filed: Oct. 28, 1969

[21] Appl. No.: 871,885

[52] U.S. Cl............................................331/94.5, 250/84
[51] Int. Cl..............................................H01s 3/00
[58] Field of Search...............250/84; 331/94.5; 330/4.5; 307/88.3

[56] References Cited

UNITED STATES PATENTS

| | | | |
|---|---|---|---|
| 3,461,403 | 8/1969 | Patel | 331/107 |
| 3,443,243 | 5/1969 | Patel | 331/94.5 |
| 3,229,095 | 1/1966 | Lasher et al. | 331/94.5 |
| 3,271,573 | 9/1966 | Frost | 250/84 |
| 3,387,204 | 6/1968 | Ashkin et al. | 330/4.5 |
| 3,443,243 | 5/1969 | Patel | 331/94.5 |
| 3,471,803 | 10/1969 | Forster | 331/94.5 |
| 3,493,893 | 2/1970 | Kaiser et al. | 331/94.5 |

Primary Examiner—James W. Lawrence
Assistant Examiner—D. C. Nelms
Attorney—Shenier and O'Connor

[57] ABSTRACT

A variable frequency infrared source in which the output of a laser of a fixed wave length and the output of a variable wave length laser are mixed in a nonlinear medium to produce an output containing a separable component in the infrared region, the frequency of which can be varied over substantially the entire infrared spectrum by varying the wave length of the variable laser.

6 Claims, 1 Drawing Figure

Patented May 23, 1972
3,665,338
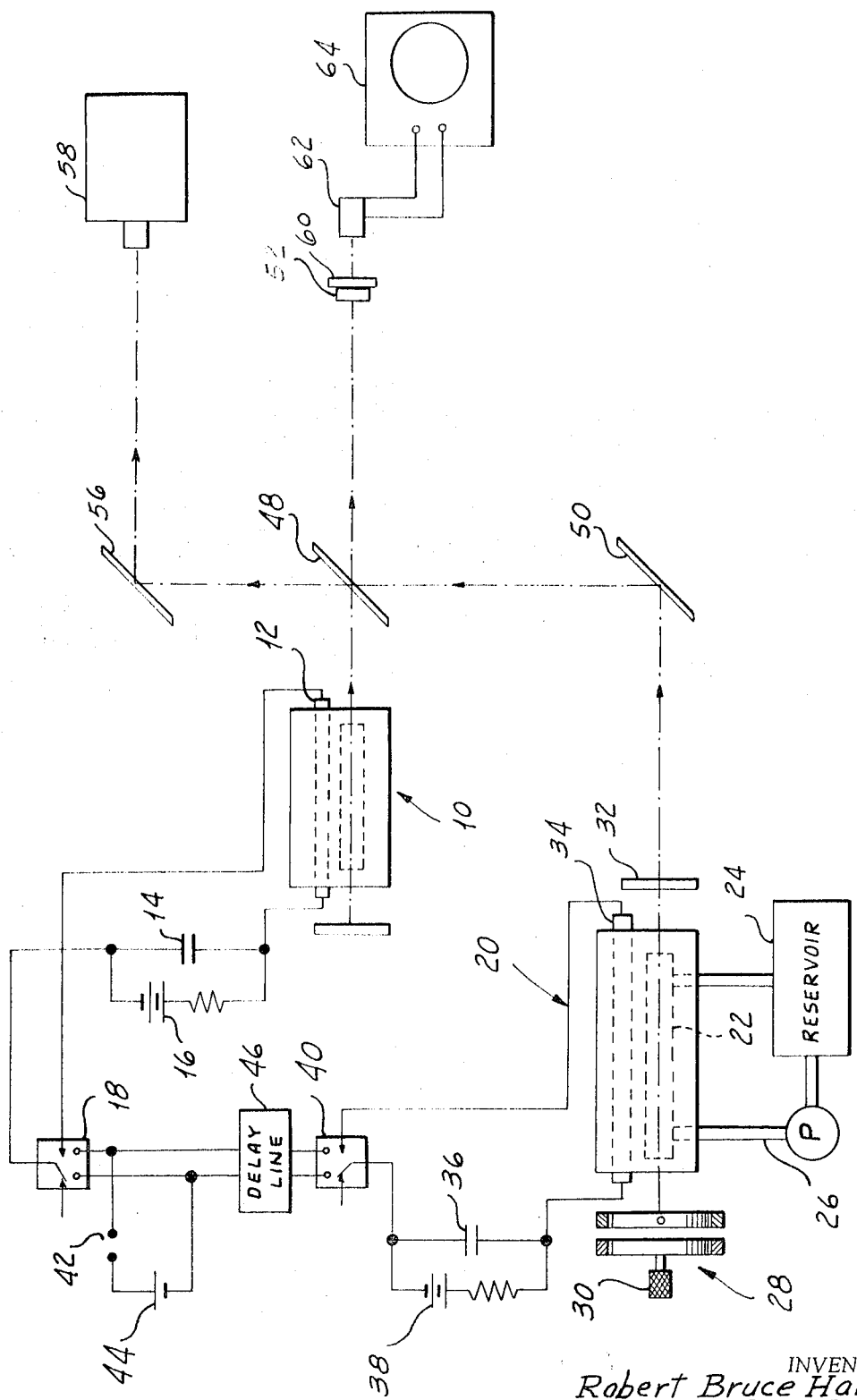
INVENTORS
Robert Bruce Harris
John A. MacDonald
BY
Shenier & O'Connor
ATTORNEYS

VARIABLE FREQUENCY INFRA RED SOURCE

BACKGROUND OF THE INVENTION

There are many instances in which a variable frequency infrared source is desirable. One example is the infrared spectrometer in which a sample to be analyzed is irradiated and in which the frequency of radiation returned from the sample is analyzed to give a picture of the molecular construction of the sample. The many other potential applications of a variable frequency infrared source will be apparent to those skilled in the art.

The only source presently known for use in the infrared region in instruments such as spectrometers, are "black body" radiators such as the globar lamp, which is a ceramic rod consisting largely of silicon carbide which can be heated to an almost white heat in air without rapid deterioration, mercury arc lamps and a few infrared lasers which operate at a fixed frequency. In general, the defects of these infrared radiators of the prior art are low intensity and a limited range of frequency of operation.

We have invented an infrared source which is frequency tunable. Our source is adapted to put out infrared radiation over substantially the entire infrared band. It is of relatively high intensity as compared with infrared sources of the prior art.

SUMMARY OF THE INVENTION

One object of our invention is to provide a source of infrared radiation which is frequency tunable.

Another object of our invention is to provide a source of infrared radiation which puts out radiation at frequencies covering substantially the entire infrared band.

A further object of our invention is to provide a variable frequency infrared source having greater intensity than do infrared sources of the prior art.

Other and further objects of our invention will appear in the following description.

In general our invention contemplates the provision of a variable frequency infrared source in which we mix radiation from a fixed wave length laser with radiation from a variable wave length laser in a nonlinear mixing device to produce an output having a component with a frequency in the infrared region, the frequency of which component can be varied by varying the wave length of the variable wave length laser.

BRIEF DESCRIPTION OF THE DRAWINGS

In the accompanying drawing the FIGURE is a schematic view of our variable frequency infrared source.

DESCRIPTION OF THE PREFERRED EMBODIMENT

Referring now to the drawing, our system includes a first laser indicated generally by the reference character 10 adapted to put out coherent radiation at a fixed frequency. This laser 10 may be of any suitable type known to the art. For example, it may be a pulsed ruby laser. Alternatively it could be a helium-neon laser, a carbon dioxide laser, an yttrium-aluminum garnet (YAG) laser, or ion laser. In the particular embodiment illustrated in the drawing we have shown a pulsed ruby or ion laser which is pulsed by a glow discharge tube 12 supplied with power from a capacitor 14 connected across a battery 16 and adapted to be coupled to the discharge tube 12 by normally open high voltage switch 18 of any suitable type known to the art. Specifically switch 18 might be a three pole electromagnetic reed switch in which, in our arrangement, the reed normally engages an inactive contact and in response to the application of a potential to the switch coil (not shown) engages an active contact to complete a power circuit for the laser. When switch 18 is activated in a manner to be described hereinafter, tube 12 is energized to pulse the laser 10 to cause it to put out a pulse of coherent light. In one particular laser which we have employed, the output pulse has a wave length of 6943 A with a pulse time length of 0.5 milliseconds and a power of 200 watts.

As a second component of our source we employ a variable wave length organic dye laser indicated generally by the reference character 20 including a dye tube 22 supplied with a suitable dye from a reservoir 24 by means of a pump 26. The laser 20 includes a diffraction grating assembly indicated generally by the reference character 28 provided with a micrometer adjustment 30 and an output mirror 32. A flash lamp 34 is adapted to be energized from a capacitor 36 connected across a battery 38 upon closing of a normally open high voltage switch 40, similar to switch 18, to pulse the laser 20. The output wave length of the laser 20 is adapted to be varied by turning the micrometer 30. In one particular form of laser we have employed the output wave length is variable over the range from 4,500 A to 6,500 A with a pulse time length of 8 microseconds and with a power of about 1,000,000 watts. Variable wave length lasers of this type are more fully described in the article "Organic Lasers" by Sorokin on pages 30 to 40 of Volume 220, No. 2 of the "Scientific American," February, 1969.

A switch 42 is adapted to be closed to apply a triggering potential of a battery 44 to the control input terminals of switch 18. When we employ a ruby laser we interpose a delay line 46 between battery 44 and switch 40 to compensate for the delay in firing of the ruby laser 10 after its power circuit has been activated. It will be appreciated that if a continuous wave laser is used as the fixed wave length source then the switch circuit could be done away with and the variable wave length laser 20 could be pulsed at will.

As an alternative to the arrangement shown in the drawings we have employed a simplified system in which a single flash lamp is associated with the cavities of both a fixed wave length ion laser and the variable wave length laser 20. This arrangement not only simplifies the system but also ensures synchronization of pulsing of the two lasers.

We direct the respective beams of radiation from the lasers 10 and 20 to a partial reflecting mirror 48 respectively directly and by means of a mirror 50. We then pass the combined beam to a mixing element 52 of the nonlinear type. This device 52 may for example be a crystal of quartz, potassium dihydrogen phosphate or zinc telluride or the like or any other nonlinear medium which in response to the application of intense electrical fields induces a polarization which is more complex in frequency content than is the incident field. Considering the effect of incident radiation on such a crystal the polarization P is expressed by the relationship:

$$P = X^1 {:} E + X^{n1} {:} EE = P^1 + P^{n1} \quad (1.)$$

Where $X^1$ is a linear susceptibility of the material and $X^{n1}$ is the nonlinear susceptibility and $E$ is the applied electrical field. The second term of equation (1) which will be designated $P^{n1}$ is the nonlinear polarization. For purposes of simplicity in exposition we will consider that the vector electrical field and the vector nonlinear polarization for components only along the Z axis which is considered as being parallel to the crystal face. The axis of propagation will be the X axis normal to the crystal face. While this simplification ignores details of the crystal structure it demonstrates the effect of mixing radiation in a nonlinear medium. Owing to the simplification outlined above the nonlinear polarization can be expressed by the scalar equation:

$$P^{n1}(x,t) = X^{n1} E^2(x,t) \quad (2)$$

If the electrical field $E(x,t)$ is made up of two fields of different frequencies $w_1$, $w_2$ then it can be written:

$$E(x,t) = E_1 \cos(k_1 x - w_1 t) + E_2 \cos(k_2 x - w_2 t + d) \quad (3)$$

where $k_1$ and $k_2$ are the wave numbers of the two fields, $E_1$ and $E_2$ are the amplitudes of the respective fields, and $d$ is a phase difference. If we let:

$$\theta_1 = k_1 x - w_1 t \quad (4)$$

and:

$$\theta_2 = k_2 x - w_2 t + d \quad (5)$$

then we can write:

$$E(x,t) = E_1 \cos \theta_1 + E_2 \cos \theta_2 \quad (6)$$

and:

$$E^2(x,t) = E_1^2 \cos^2 \theta_1 + 2 E_1 E_2 \cos\theta_1 \cos\theta_2 + E_2^2 \cos^2 \theta_2 \quad (7)$$

By trigonometric identity equation (7) can be rewritten as:

$$E^2(x,t) = \tfrac{1}{2}(E_1^2+E_2^2) + \tfrac{1}{2}E_1^2\cos 2\theta_1 + \tfrac{1}{2}E_2^2\cos 2\theta_2 + E_1E_2\cos(\theta_1 + \theta_2) + E_1E_2\cos(\theta_1-\theta_2) \quad (8)$$

Substituting for $\theta_1$ and $\theta_2$ we obtain:

$$E^2(x,t) = \tfrac{1}{2}(E_1^2+E_2^2) + \tfrac{1}{2}E_1^2\cos 2(k_1x-w_1t) + \tfrac{1}{2}E_2^2\cos 2(k_2x-w_2t+d)E_1E_2\cos[(k_1+k_2)x-(w_1+w_2)t+d]+E_1E_2\cos[(k_1-k_2)x-a(w_1-w_2)t-d] \quad (9)$$

which represents the output of crystal 52 as a result of the non-linear polarization. It will be seen that equation (9) contains a first term which is a D.C. term, a second term which is a second harmonic term, a third term which is a sum frequency term and a fourth term which is a difference frequency term. The difference frequency term results in an output at a frequency $w_0 = w_1 - w_2$, which, in terms of wave length, is $1/\lambda_0 = 1/\lambda_1 - 1/\lambda_2$. For simplicity we will consider that the fixed wave length laser 10 provides the wave length $\lambda_2$ and calculate the various values of $\lambda_1$ necessary to produce outputs at the limits of the infrared region. Solving the wave length expression given above for $\lambda_1$ we obtain:

$$\lambda_1 = (\lambda_0 \lambda_2)/(\lambda_0 + \lambda_2) \quad (10)$$

At the lower limit of the infrared region whereat $\lambda_0 = 1u$ we obtain:

$$\lambda_1 = (0.7u)/(1.7u) = 0.41u \quad (11)$$

At the upper limit of the infrared region where $\lambda_0 = 1,000u$ we obtain equation $$\lambda_1 = (700u)/(1000.7u) = 0.7u \quad (12)$$

From the foregoing analysis it will be clear that in order to produce output radiation over the entire infrared band the variable wave length laser must be capable of producing output radiation over the range of from 0.41u to 0.7u. From the description of our variable wave length source outlined above it will be clear that it is capable of putting out radiation at the required wave lengths to cause the nonlinear device 52 to put out radiation over the entire infrared spectrum.

The elements of structure thus far described form all the essentials of our source. The desired infrared radiation may be isolated from the output of the device 52 by use of suitable filters.

The output of the device 52 is a highly collimated beam of radiation. In order to separate the desired radiation from the unwanted we employ a suitable filtering system 60 immediately adjacent the rear face of the crystal. For example we may use absorption filters of polyethylene which pass only the desired infrared radiation. Alternately we may separate desired infrared radiation from the unwanted output by the use of a suitable diffraction grating.

While all the elements which go to make up our source have already been described in an experimental setup which we used to check our results we passed the filtered output of the device 52 to a suitable detector 62 such as a golay cell 62, which, as is known in the art, is a small transparent cell containing gas wherein a very thin film within the cell absorbs incident radiation to increase the cell temperature and pressure. Conveniently we displayed the output of cell 62 on an oscilloscope 64. Cell 62 thus provides a measure of the intensity of the filtered radiation. In order to check that the filtered radiation is in the infrared region, we employ a reflector 56 to direct part of the combined radiation of the two lasers from beam splitter 48 to a single pass, concave grating optical frequency spectrometer 58 of a type known in the art.

In operation of our source of variable infrared radiation switch 42 is closed to activate the triggering system of the two lasers 10 and 20. Portions of the outputs of the two lasers are combined in the beam splitter 48 and the combined beam is directed to the nonlinear element 52. Light pipes and lenses are employed as required to direct the various beams. In response to the incident combined beam the device 52 puts out radiation including an infrared component which may be separated from unwanted radiation by the filter arrangement 60. In order to vary the frequency of the output infrared radiation it is necessary only to change the wave length of the organic dye laser 20. This is easily done by actuating the micrometer knob 30. As will be apparent from the description given hereinabove our arrangement permits us to vary the frequency of the output radiation over the entire infrared band.

It will be seen that we have accomplished the objects of our invention. We have provided an infrared source which overcomes the defects of infrared sources of the prior art. Our source is frequency tunable over substantially the entire infrared range. The intensity of our source is many times greater than the intensity of most infrared sources of the prior art.

It will be understood that certain features and subcombinations are of utility and may be employed without reference to other features and subcombinations. It is further obvious that various changes may be made in details without departing from the spirit of our invention. It is, therefore, to be understood that our invention is not to be limited to the specific details shown and described.

Having thus described our invention, what we claim is:

1. A source of frequency variable infrared radiation including in combination, a first laser for producing a first beam of radiation at a fixed wave length, a second organic dye laser for producing a second beam of radiation the wave length of which can be varied over a predetermined range, means for activating said lasers in synchronism to cause them to produce said first and second beams, means for combining said first and second beams, an element having a nonlinear response to incident radiation, means for directing said combined beams onto said element to cause the element to produce output radiation containing a component in the infrared region, and manually operable means for varying the wave length of said second beam to vary the frequency of said infrared component.

2. A source as in claim 1 in which said means for producing said first beam is a pulsed ruby laser.

3. A source as in claim 1 in which said means for producing said first beam is a continuous wave laser.

4. A source as in claim 1 in which said means for producing said first beam is a pulsed ion laser.

5. A source as in claim 1 in which each of said first and second beam producing means is a pulsed laser and means for pulsing said lasers in synchronism.

6. A source as in claim 1 in which said element produces said infrared radiation and unwanted radiation, said source including means for separating said infrared radiation from said unwanted radiation.

* * * * *

PO-1050
(5/69)

UNITED STATES PATENT OFFICE
CERTIFICATE OF CORRECTION

Patent No. 3,665,338                    Dated  May 23, 1972

Inventor(s) Robert Bruce Harris and John A. MacDonald

It is certified that error appears in the above-identified patent and that said Letters Patent are hereby corrected as shown below:

On the title page, under [73] Assignee:

"Sea Girt, N.Y." should read -- Princeton, N.J. --

Signed and sealed this 31st day of October 1972.

(SEAL)
Attest:

EDWARD M. FLETCHER, JR.                 ROBERT GOTTSCHALK
Attesting Officer                       Commissioner of Patents